United States Patent
Cho et al.

(10) Patent No.: US 10,008,108 B2
(45) Date of Patent: Jun. 26, 2018

(54) METHOD AND APPARATUS FOR CONTROLLING HOME NETWORK SYSTEM USING MOBILE TERMINAL

(75) Inventors: Hyung-Rae Cho, Seoul (KR); Sun-Ae Kim, Seoul (KR); Ji-Young Kwahk, Gyeonggi-do (KR); Hyun-Joo Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 167 days.

(21) Appl. No.: 12/914,331

(22) Filed: Oct. 28, 2010

(65) Prior Publication Data
US 2011/0106279 A1    May 5, 2011

(30) Foreign Application Priority Data
Oct. 30, 2009  (KR) .................. 10-2009-0104518

(51) Int. Cl.
| G05B 11/01 | (2006.01) |
| G08C 17/02 | (2006.01) |
| H04L 12/28 | (2006.01) |

(52) U.S. Cl.
CPC .......... *G08C 17/02* (2013.01); *H04L 12/2818* (2013.01); *G08C 2201/41* (2013.01);
(Continued)

(58) Field of Classification Search
CPC ..... G05B 2219/2642; H04N 21/43615; H04N 21/6125; G08B 25/10; G08B 13/19658;
(Continued)

(56) References Cited

U.S. PATENT DOCUMENTS 6,756,998 B1 * 6/2004 Bilger ................ H04L 12/2803
   715/734
6,801,507 B1 * 10/2004 Humpleman ....... H04L 12/2805
   370/252
(Continued)

FOREIGN PATENT DOCUMENTS

| CA | 2400556 A1 * 10/2001 ......... G08B 13/1418 |
| CN | 101176055     5/2008 |
(Continued)

OTHER PUBLICATIONS

Korean Office Action dated Aug. 17, 2015 issued in counterpart application No. 10-2009-0104518, 7 pages.
(Continued)

*Primary Examiner* — Darrin Dunn
(74) *Attorney, Agent, or Firm* — The Farrell Law Firm, P.C.

(57) ABSTRACT

A method for controlling a home network system using a mobile terminal is provided, which includes the mobile terminal connecting to a gateway of a home network through a communication network, the mobile terminal receiving a list of devices which are connected to the home network from the gateway of the home network, the mobile terminal displaying the devices connected to the home network, if one of the displayed devices is selected, requesting the status information of the selected device from the selected device status information of the selected device through the gateway, receiving the status information of the selected device from the selected device, and displaying the received status information and a user interface for controlling the selected device.

12 Claims, 5 Drawing Sheets

(52) U.S. Cl.
CPC ..... *G08C 2201/42* (2013.01); *G08C 2201/50* (2013.01); *G08C 2201/93* (2013.01)

(58) Field of Classification Search
CPC .......... G08B 13/1966; G08B 13/19669; G08B 13/19684; G08B 21/14; G08B 25/003; G08B 25/004; G08B 25/08
USPC .... 709/217, 218, 223, 225, 229; 700/17, 65, 700/83, 99; 340/3.1, 3.9, 4.3, 4.32, 340/12.22; 715/734
See application file for complete search history.

(56) References Cited

U.S. PATENT DOCUMENTS

| | | | |
|---|---|---|---|
| 7,047,092 B2 * | 5/2006 | Wimsatt | G05B 15/02 345/173 |
| 7,293,236 B2 * | 11/2007 | Choi et al. | 715/734 |
| 7,469,294 B1 * | 12/2008 | Luo | H04L 63/0272 370/406 |
| 7,490,293 B1 * | 2/2009 | Humpleman | H04L 12/2809 709/203 |
| 7,558,862 B1 * | 7/2009 | Tyukasz | H04L 63/029 709/227 |
| 7,778,654 B2 * | 8/2010 | Ahn et al. | 455/466 |
| 7,978,837 B2 * | 7/2011 | Kim et al. | 379/201.02 |
| 8,149,095 B2 * | 4/2012 | Hayashi et al. | 340/286.02 |
| 8,345,564 B2 * | 1/2013 | Cho et al. | 370/252 |
| 8,402,122 B2 * | 3/2013 | Cho | H04L 12/2809 370/310 |
| 2002/0035699 A1 * | 3/2002 | Crosbie | H04L 63/10 726/12 |
| 2002/0163534 A1 * | 11/2002 | Choi | G10H 1/368 715/728 |
| 2003/0009537 A1 * | 1/2003 | Wang | 709/219 |
| 2003/0051009 A1 * | 3/2003 | Shah et al. | 709/220 |
| 2004/0146057 A1 * | 7/2004 | Yi et al. | 370/401 |
| 2004/0205172 A1 * | 10/2004 | Kim | H04L 12/2803 709/222 |
| 2005/0097478 A1 | 5/2005 | Killian et al. | |
| 2005/0120246 A1 * | 6/2005 | Jang | H04L 12/2807 726/4 |
| 2005/0216729 A1 * | 9/2005 | Joels | H04L 9/0844 713/153 |
| 2006/0036678 A1 * | 2/2006 | Rhim | H04L 67/36 709/203 |
| 2006/0059003 A1 * | 3/2006 | Requena et al. | 705/1 |
| 2006/0064493 A1 * | 3/2006 | Hammell | H04L 63/0815 709/227 |
| 2006/0094402 A1 * | 5/2006 | Kim | H04M 1/7253 455/411 |
| 2006/0129938 A1 * | 6/2006 | Humpleman | H04L 12/2803 715/734 |
| 2006/0137005 A1 * | 6/2006 | Park | H04L 29/12009 726/21 |
| 2006/0168178 A1 * | 7/2006 | Hwang et al. | 709/223 |
| 2006/0185004 A1 * | 8/2006 | Song | H04L 63/0815 726/8 |
| 2006/0248208 A1 * | 11/2006 | Walbeck et al. | 709/230 |
| 2006/0248332 A1 * | 11/2006 | Kim | H04L 63/102 713/155 |
| 2006/0250578 A1 | 11/2006 | Pohl et al. | |
| 2007/0104193 A1 * | 5/2007 | Choi | H04L 12/2827 370/389 |
| 2007/0197236 A1 * | 8/2007 | Ahn | H04L 12/2809 455/466 |
| 2007/0205858 A1 * | 9/2007 | Choi | G05B 15/02 340/3.1 |
| 2007/0232269 A1 * | 10/2007 | Jung | G06F 21/602 455/411 |
| 2007/0288487 A1 * | 12/2007 | Song et al. | 707/10 |
| 2008/0026725 A1 * | 1/2008 | Cha | 455/411 |
| 2008/0051118 A1 | 2/2008 | Shin | |
| 2008/0205419 A1 | 8/2008 | Shin et al. | |
| 2008/0209034 A1 * | 8/2008 | Shin | H04L 12/2807 709/224 |
| 2008/0233983 A1 * | 9/2008 | Park | H04L 12/2818 455/466 |
| 2008/0263124 A1 * | 10/2008 | Song et al. | 709/201 |
| 2008/0270937 A1 * | 10/2008 | Poulet | G05B 19/0426 715/810 |
| 2008/0313530 A1 * | 12/2008 | Song | H04L 12/2803 715/234 |
| 2008/0313531 A1 * | 12/2008 | Song et al. | 715/234 |
| 2009/0072991 A1 * | 3/2009 | Hayashi et al. | 340/825 |
| 2009/0077167 A1 * | 3/2009 | Baum et al. | 709/203 |
| 2009/0077241 A1 * | 3/2009 | Choi | H04L 45/00 709/227 |
| 2009/0198735 A1 * | 8/2009 | Yu | H04L 67/306 |
| 2009/0239587 A1 * | 9/2009 | Negron | G06F 3/04883 455/566 |
| 2009/0240815 A1 * | 9/2009 | Han et al. | 709/227 |
| 2009/0248848 A1 * | 10/2009 | Jeong | G06F 21/10 709/223 |
| 2009/0249448 A1 * | 10/2009 | Choi | H04L 63/0815 726/4 |
| 2009/0265540 A1 * | 10/2009 | Jin | H04L 63/0428 713/150 |
| 2009/0319695 A1 * | 12/2009 | Saint-Hilaire | H04L 29/12009 710/11 |
| 2010/0030904 A1 * | 2/2010 | Oda | H04L 65/1016 709/228 |
| 2010/0099382 A1 * | 4/2010 | Ishiguro et al. | 455/411 |
| 2010/0122215 A1 * | 5/2010 | MacGregor | G06F 3/0482 715/834 |
| 2010/0191352 A1 * | 7/2010 | Quail | H04L 12/2809 700/90 |
| 2010/0217837 A1 * | 8/2010 | Ansari et al. | 709/218 |
| 2012/0290694 A9 * | 11/2012 | Marl | H04L 12/2807 709/223 |

FOREIGN PATENT DOCUMENTS

| | | |
|---|---|---|
| KR | 1020040021305 | 3/2004 |
| KR | 1020050091418 | 9/2005 |
| KR | 1020070060957 | 6/2007 |
| KR | 1020070063164 | 6/2007 |
| KR | 10-0790173 | 1/2008 |
| KR | 1020080002362 | 1/2008 |

OTHER PUBLICATIONS

Korean Office Action dated Feb. 29, 2016 issued in counterpart application No. 10-2009-0104518, 9 pages.

* cited by examiner

METHOD AND APPARATUS FOR CONTROLLING HOME NETWORK SYSTEM USING MOBILE TERMINAL

PRIORITY

This application claims priority under 35 U.S.C. § 119(a) to Korean Patent Application filed in the Korean Industrial Property Office on Oct. 30, 2009 and assigned Serial No. 10-2009-0104518, the entire contents of which are incorporated herein by reference.

BACKGROUND OF THE INVENTION

1. Field of the Invention

The present invention relates to home device control of a home network system, and more particularly to a method and apparatus for observing the status of devices in a home network system, managing and controlling the operation of the devices using a mobile terminal.

2. Description of the Related Art

A home network is the next-generation IT (Information Technology) technology that has been recently attracting a lot of attention, and is an aggregate of technologies that can maximize convenience in life in combination with the Internet based on the control, management, integration, and interlocking of information home appliances. The home network is divided into a lower network technology for physical data transmission, a middleware technology for interlocking with upper applications, and an information home technology that is applied to respective home appliances. At present, the home network has been combined with broadband communication, wireless Internet, sensor technology, and the like, and has extended to ubiquitous computing.

In such a home network system, research for a home network middleware that corresponds to an interface between a lower network layer and an application layer for controlling and managing information home appliances has been conducted. At present, diverse types of home network middleware, such as Universal Plug and Play (UPnP), Jini technology, Phone Service Gateway Initiative (PSGi), Home Audio/Video Interoperability (HAVi), and the like, have been provided and coexisted in a state where none of them has the superiority in technique.

Although home network systems, which have recently started to be installed at home around apartments, provide various services through wired/wireless appliances connected therein around a single home gateway, they cannot get out of the existing home automation level, except for services using external Internet, and run short of practicality due to the nonexistence of applications.

SUMMARY OF THE INVENTION

Accordingly, the present invention has been made to solve the above-mentioned problems occurring in the prior art, and the present invention provides a method and apparatus for conveniently observing, managing, and controlling the status of devices in a home network system from the outside using a mobile terminal.

In accordance with an aspect of the present invention, there is provided a method for controlling a home network system using a mobile terminal, which includes the mobile terminal connecting to a gateway of a home network through a communication network; the mobile terminal receiving a list of devices which are connected to the home network from the gateway of the home network; the mobile terminal displaying the devices connected to the home network; if one of the displayed devices is selected, requesting the status information of the selected device from the selected device through the gateway; receiving the status information of the selected device from the selected device; and displaying the received status information and a user interface for controlling the selected device.

The method for controlling a home network system using a mobile terminal according to an embodiment of the present invention may further include transferring a control command to the gateway of the home network if the control command is input through the user interface for controlling the selected device.

In accordance with another aspect of the present invention, there is provided a mobile terminal for controlling a home network system, which includes a display unit displaying various kinds of display content and messages; an input unit provided with a plurality of numeral keys and function keys to output key input data that corresponds to a key pressed by a user; a storage unit storing programs and data which are used when the mobile terminal operates; a communication unit performing wireless communication with a mobile communication base station and performing communication with a home network system gateway for controlling home devices of the home network system; and a control unit controlling operations of other constituent units, connecting to the home network, receiving a list of the devices connected to the home network from the home network gateway, displaying the devices connected to the home network, if one of the displayed devices is selected, requesting the status information of the selected device from the selected device through the gateway, receiving the status information of the selected device from the selected device, and displaying the received status information and a user interface for controlling the selected device.

BRIEF DESCRIPTION OF THE DRAWINGS

The above and other aspects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Figure 1:
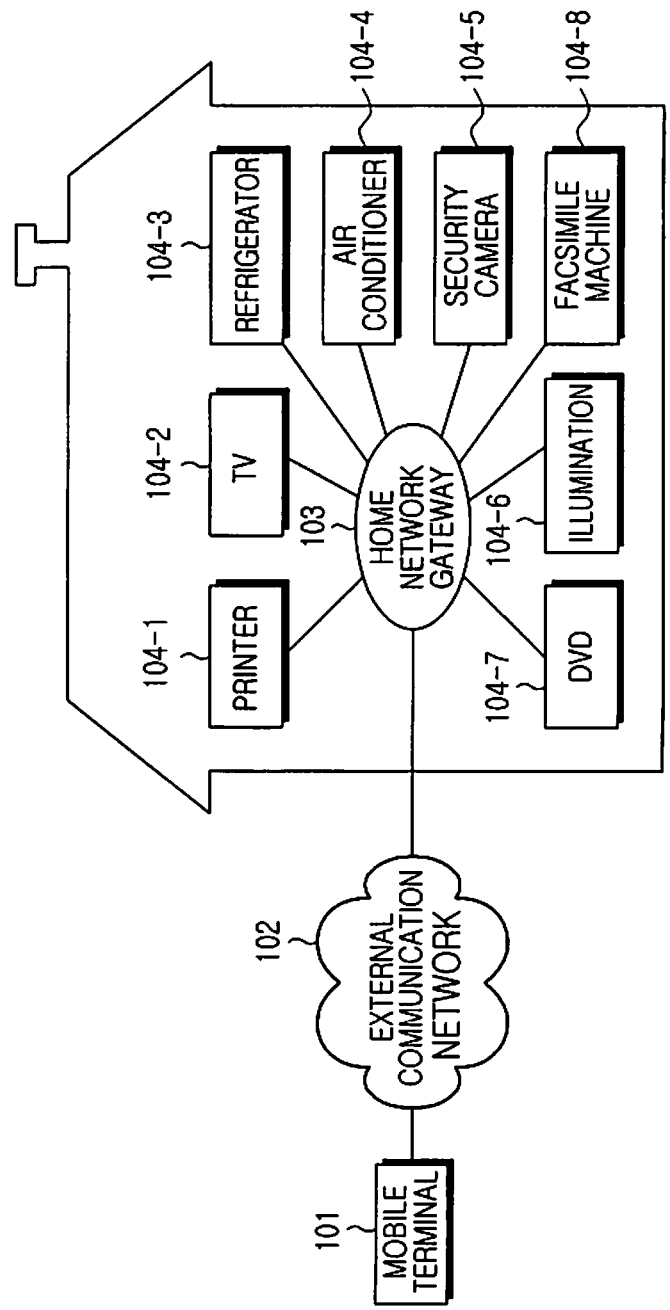
FIG. 1 is a diagram illustrating the configuration of a home network system and a mobile terminal connected thereto according to an embodiment of the present invention.

Hereinafter, embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 is a diagram illustrating the configuration of a home network system and a mobile terminal connected thereto according to an embodiment of the present invention. As illustrated in FIG. 1, a home network system according to an embodiment of the present invention includes a home network gateway 103 which operates as a server and is connectable with an external communication network 102, and home devices 104 which are client appliances connected thereto. The home devices 104 are devices which are connected to a home network and can be controlled or can perform data transmission/reception, such as a printer, TV, refrigerator, air conditioner, security camera, facsimile machine, illumination, DVD, doorway, phone set, washing machine, and the like. On the other hand, the home network gateway 103 may be implemented in the form of an electronic frame or a Personal Computer (PC), and operates as a home device 104 to transfer status information to an external mobile terminal 101 or to be controlled.

The home devices 104 can provide their status information to the external communication network 102 through the home network gateway 103. In the present invention, the external mobile terminal 101 connected to the external communication network 102 receives the status information, and controls the home devices 104-1 through 104-8 by transferring a command for controlling the home devices 104 through the gateway 103. Here, the external communication network 102 may be a general mobile communication network, 3G network, or wireless Internet.

The home network system as configured above supports home network middleware. Accordingly, from a viewpoint of a home application for home services, communication becomes possible even without considering the detailed items of the devices that support the home network middleware, and even from a viewpoint of an individual device, connection to all service applications that support the home network middleware becomes possible.

Figure 2:
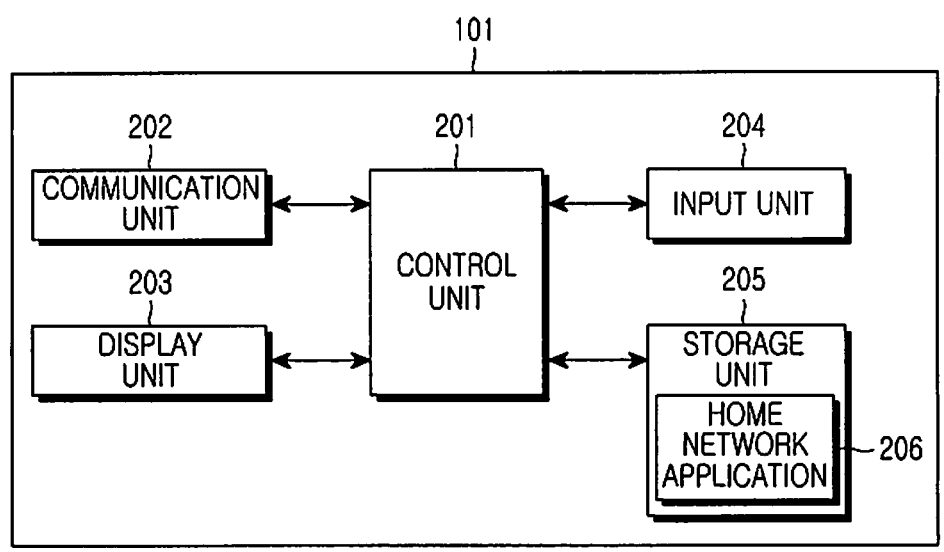
FIG. 2 is a diagram illustrating the configuration of a mobile terminal according to an embodiment of the present invention.

FIG. 2 is a diagram illustrating the configuration of a mobile terminal according to an embodiment of the present invention. Referring to FIG. 2, a mobile terminal 101 includes a communication unit 202, an input unit 204, a display unit 203, a storage unit 205, and a control unit 201.

The control unit 201 performs a general communication function such as calling, data transmission/reception, or the like, and controls other constituent units. Also, the control unit 201 connects to a home network, receives a list of devices connected to the home network from the gateway of the home network, and displays the devices connected to the home network through the display unit 203. If one of the displayed devices is selected by a user, the control unit 201 requests the selected device status information of the selected device through the gateway, receives the status information from the selected device, and displays the received status information and a means for controlling the selected device through the display unit 203.

The display unit 203 displays various kinds of display content and messages under the control of the control unit 201. The display unit 203 may be provided through a Liquid Crystal Display (LCD), Thin Film Transistor (TFT), organic Electroluminescence (EL), or the like.

The input unit 204 is provided with a plurality of numeral keys and function keys, and outputs key input data that corresponds to the key pressed by a user to the control unit 201. If the display unit 203 is composed of a touch screen, the display unit 203 operates also as the input unit 204.

The storage unit 205 is composed of a Read Only Memory (ROM) and a Random Access Memory (RAM) for storing programs and data which are used when the mobile terminal operates. Also, the storage unit 205 stores data of a home network application 206 in the mobile terminal. The application data 206 includes information that is used to execute the home network application and information on sub applications including a user interface for displaying the status information and controlling the operations of the home devices 104 of FIG. 1 connected to the home network.

The mobile terminal typically performs wireless communication with a base station, and for this, the communication unit 202 transmits/receives an RF signal to/from the base station through an antenna. Also, the communication unit 202 performs communication with a home network system gateway for controlling the home devices of the home network system.

Figure 3:
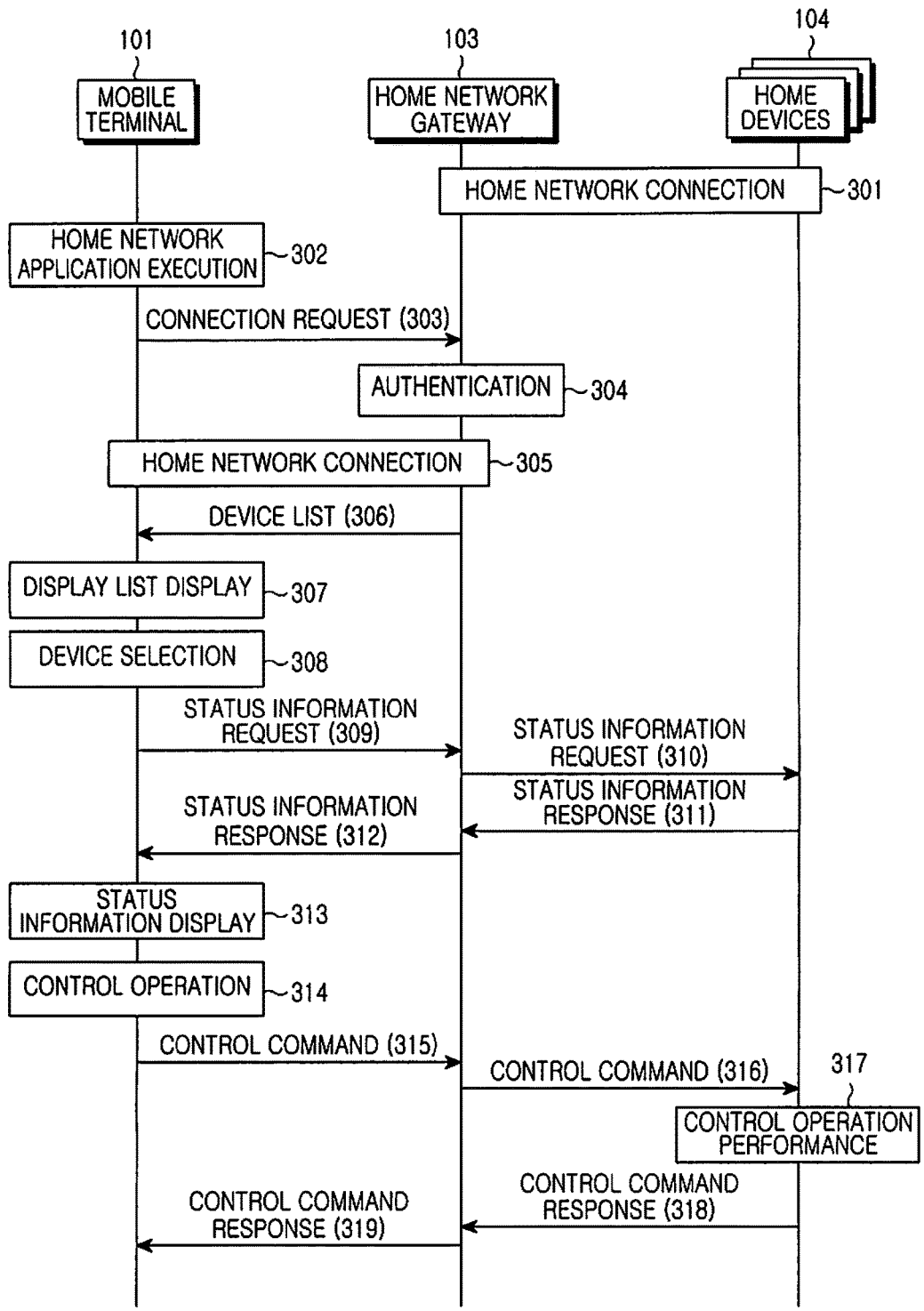
FIG. 3 is a diagram illustrating an operational flow for controlling home devices of a home network system according to an embodiment of the present invention.

FIG. 3 is a diagram illustrating an operational flow for controlling home devices of a home network system according to an embodiment of the present invention. FIG. 3 shows processes in which the mobile communication terminal 101 enters into the home network, grasps the status information of the home devices connected to the home network, and controls the operations of the home devices.

Referring to FIG. 3, first in step 301, the home devices 104 are connected to the home network of the gateway 103. In the case where UPnP home network middleware is used step 103 can be performed through processes in which the gateway 103 finds the home device 104 on the network, allocates an address thereto, discovers the appliance, confirms the description of the appliance, and performs event, control and presentation operations.

The UPnP that is the middleware exemplified in the respective processes is an Internet Protocol based network, and thus an Internet Protocol address (IP) is used for each device connected to the network. Accordingly, IP allocation, i.e. address allocation, is first performed. If IPs have been assigned to the respective devices through address allocation, it is used to discover the devices to be controlled. For this, the controller (gateway) discovers the devices using a protocol called Simple Service Discovery Protocol (SSDP). In this case, the controller searches for a concerned device, and a controlled device (home device) responds to this. Also, if the controlled device connects to the network, it automatically informs other devices of the connection, and then periodically informs other devices whether the connection continues.

If the device is discovered, it is required to know which services the respective devices could perform. For this, if the controller finds the controlled device, the controlled device sends a Uniform Resource Locator (URL) which contains description of the device to the controller, and the controller brings the description of the device that is in the form of an Extensible Markup Language (XML) document from the controlled device. This document includes manufacturer information, product information (model, serial number, and the like), a service list, and the like.

Then, the controller brings the description of the device from the controlled device, analyzes the service of the device described therein, and sends an appropriate action, also referred to as a "control command," to the device to control the controlled device. The protocol that is used in that transaction is XML Language/Simple Object Access Protocol (SOAP).

Also, in the home network, the status of the device is frequently changed according to a surrounding environment. Since such change may be important information to a user, the UPnP defines the event. The controller observes such change of the status of the controlled device, and the controlled device transfers an event message, also referred to as the "event," to the controller when its status is changed. The event is composed of a pair (name, value), and the protocol that is used for the event is an XML type Generic Event Notification Architecture (GENA). Also, the controller can read a Hyper Text Markup Language (HTML) page of the controlled device. This HTML page shows a user interface related to the use of equipment, also referred to as "presentation," and through this, the equipment is controlled or the status is shown. As described above, in the home network system, a user can perform systematic connection through the networking for the individual home devices at home using the UPnP, and can receive diverse services accordingly.

As described above, although the home network construction according to the present invention has been described on the basis of the UPnP middleware, the home network according to the present invention can be implemented using diverse types of home network middleware, such as OSGi, HAVi, and the like.

Referring again to FIG. 3, if the external mobile terminal 101 performs the application for connecting to the home network in step 302 after the home network connection is performed through the above-described procedure in step 301, the mobile terminal transmits a connection request to the gateway 103 of the home network in step 303. Such a connection request may include user authentication information of the mobile terminal 101 (e.g. user authentication card information, user ID, secret number, and the like) and information on the mobile terminal 101.

Figure 4:
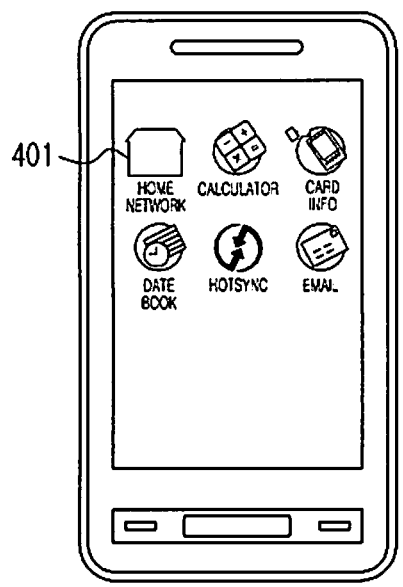
FIG. 4 is a diagram illustrating a display example of an application selection screen for a mobile terminal to control home devices of a home network system when the mobile terminal controls the home devices of the home network system according to an embodiment of the present invention.

FIG. 4 is a diagram illustrating a display example of an application selection screen for a mobile terminal to control home devices of a home network system when the mobile terminal controls the home devices of the home network system according to an embodiment of the present invention. In step 302, the user can select and execute an application for connecting to the home network indicated in the form of an icon through a screen as illustrated in FIG. 4.

In step 304, the gateway performs an authentication procedure through the user authentication information of the mobile terminal 101. Then, in step 305, the mobile terminal connects to the home network. In step 306, the gateway 103 provides list information on the home devices 104 connected to the home network to the mobile terminal 101. The list information on the home devices 104 may include basic information of the home devices 104, such as names, types, and the like.

Figure 5:
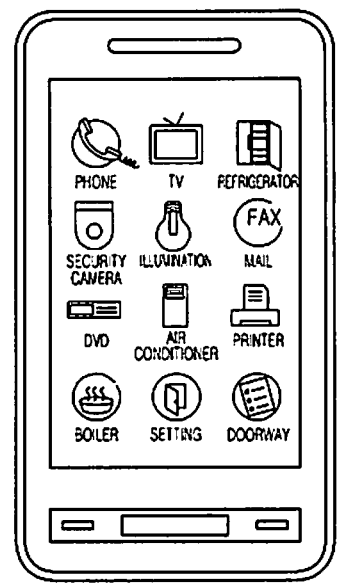
FIG. 5 is a diagram illustrating a display example of a mobile terminal when an application for controlling home devices of a home network system is selected on the screen of FIG. 4.

Next, the mobile terminal 101, in step 307, displays a list of devices connected to the home network using the received device list information. FIG. 5 is a diagram illustrating a display example of a mobile terminal when an application 401 for controlling home devices of a home network system is selected on the screen of FIG. 4. In step 307, the user can see the list of devices 104 connected to the home network displayed in the form of an icon through the screen as shown in FIG. 5, and can select a specified device 104.

On the other hand, the list of the home devices 104 displayed on the application can be automatically added or deleted according to the home device 104 currently connected to the home network, and the shapes of icons may be set by the user. Also, the user interface that displays the status information of the home devices 104 or kinds and types of control buttons is received through the gateway 103 or is directly received from the corresponding home device 104 through the gateway 103. Accordingly, if there is a new home device 104 not stored in the home network application of the storage unit, connected to the home network during execution of the application, the user can download a dedicated sub application of the corresponding home device 104 that includes a user interface for displaying and controlling the status information of the corresponding home device 104. Such a sub application may be downloaded through the Internet.

Accordingly, if the specified device 104 is selected by the user in step 308, a signal for requesting the current status information of the selected device 104 is transferred to the gateway 103 in step 309. The status information of the device includes at least one of a power on/off state of the device, a current operation state, and a component or material status. In step 310, the gateway 103 transfers a signal for requesting the status information (UPnP action) from the selected device to the corresponding device 104, and in step 311, receives the status information from the corresponding device 104. In step 312, the gateway 103 transfers the received status information to the mobile terminal 101 through the external communication network, and in step 313, the mobile terminal 101 outputs a screen for displaying the status information of the device selected by the user and the user interface for performing a control operation such as a control button using the received status information. Then, in step 314, if a control operation such as pressing of a control button by the user or a like input, the mobile terminal 101, in step 315, transfers the control command to the gateway 103, and the gateway 103, in step 316, transfers the control command (UPnP action) to the corresponding device 104 of the home network. In step 317, the device 104 performs the operation according to the control command. Then, in step 318, the home device 104 transfers the result of performing the operation to the gateway 103 as a response to the control command, and in step 319, the gateway 103 transfers the control command response to the mobile terminal 101.

Figure 6:
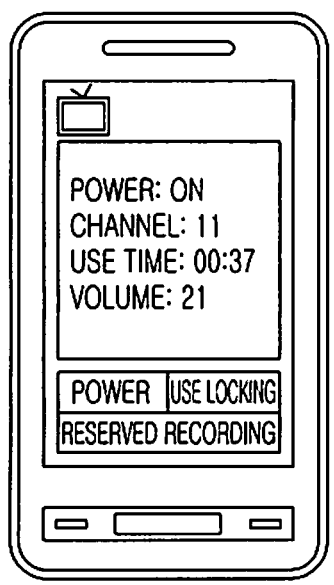
FIG. 6 is a diagram illustrating a display example of a mobile terminal when a Television (TV) is selected on the screen of FIG. 5.

Examples of the screen display, in which the user selects one of the devices connected to the home network in step 313 are shown in FIGS. 6, 7, 8, and 9. FIG. 6 is a diagram illustrating a display example of a mobile terminal when a TV is selected on the screen of FIG. 5. As shown in FIG. 6, the user can easily see the status information, such as whether the power of the TV is in a turned-on state, selected channel, use time, volume, and the like, through a status information window, and can remotely control the power on/off, use locking, and the like, through the control button positioned below the status information window.

Figure 7:
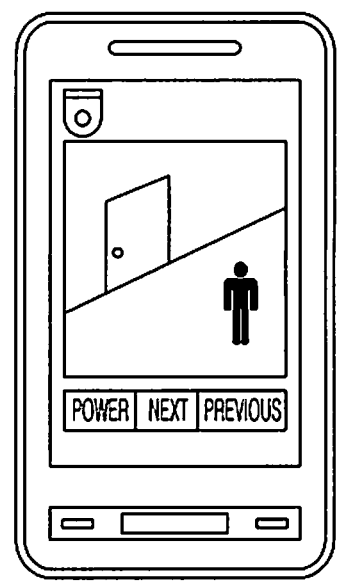
FIG. 7 is a diagram illustrating a display example of a mobile terminal when a security camera is selected on the screen of FIG. 5.

FIG. 7 is a diagram illustrating a display example of a mobile terminal when a security camera is selected on the screen of FIG. 5. As shown in FIG. 7, the user can see the currently captured image of streamed security camera through the status information window, and can remotely control the power on/off or an operation for viewing captured images of other security cameras through the control button positioned below the status information window.

Figure 8:
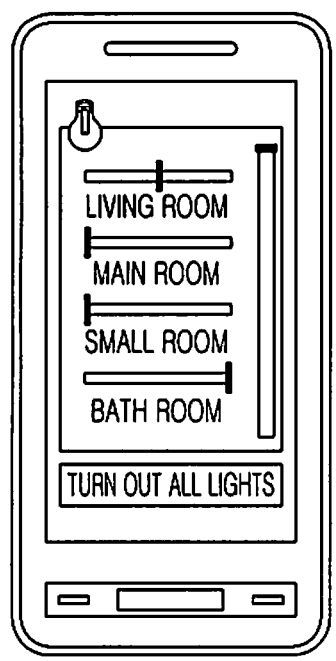
FIG. 8 is a diagram illustrating a display example of a mobile terminal when illumination is selected on the screen of FIG. 5.

FIG. 8 is a diagram illustrating a display example of a mobile terminal when illumination is selected on the screen of FIG. 5. As shown in FIG. 8, the user can see the current illumination state of the house through the status information window, and can set the illumination on or off or vary the intensity a direct touch of the status information window or another manipulation button or a user interface.

Figure 9:
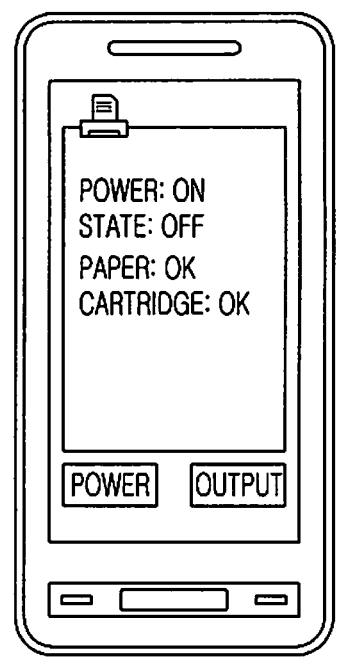
FIG. 9 is a diagram illustrating a display example of a mobile terminal when a printer is selected on the screen of FIG. 5.

FIG. 9 is a diagram illustrating a display example of a mobile terminal when a printer is selected on the screen of FIG. 5. As shown in FIG. 9, the user can grasp the power on/off state, output state, cartridge or paper state of the printer, and can control the power on/off and the output of the printer.

In addition, although not illustrated in the drawing, even in the case of a refrigerator, the user can grasp the current temperature of the refrigerator, set temperature, the amount of loaded food as compared with a reference amount of food, existence/nonexistence of ice, and the like, through a status display window, and can remotely control the set temperature or power on/off through a user interface such as a control button or touch screen.

Also, even in the case of a washing machine, status information, such as the current operation state of the washing machine, the amount of washing water, start/end time, the necessary time, and the like, can be displayed through a status display window, and the user can control the operation of the washing machine through a user interface such as a control button, touch screen, and the like.

Even in the case of an air conditioner or a boiler, status information such as the current temperature, set temperature, reserved setting, and the like, can be displayed through a status display window, and the user can perform temperature setting, reserved setting, and the like, through a user interface such as a control button, touch screen, and the like.

As described above, according to the present invention, a user can observe, manage, and control the status of devices of a home network system using an application of a mobile communication terminal from the outside of the house. That is, a user can grasp the current status of home appliances or control devices by connecting to a home network through the mobile communication terminal from the outside of the house, and can easily control or manipulate the home appliances or control devices connected to the home network through the application of the mobile communication terminal.

While the operation and configuration of the method and apparatus for controlling a home network system using a mobile terminal have been shown and described with reference to certain embodiments thereof, it will be understood by those skilled in the art that various changes in form and details may be made therein without departing from the spirit and scope of the invention as defined by the appended claims.

What is claimed is:

1. A method for controlling a home network, the method comprising:
    receiving a connection request including user authentication information from a mobile terminal in the home network, wherein the connection request is transmitted based on an application installed in the mobile terminal;
    performing an authentication procedure of the mobile terminal based on the user authentication information of the mobile terminal:
    upon connecting with the mobile terminal, transmitting a list of at least one device connected to the home network so that the mobile terminal is capable of displaying status information and a user interface including at least one control button for performing a different control operation according to a type of the at least one device selected by the user below the status information, to the mobile terminal;
    receiving a request for a current status information of a device selected by the user among the transmitted list and transmitting the received request to the selected device;
    receiving a response of the current status information from the selected device in response to the request, and transmitting the received response to the mobile terminal; and
    upon receiving a control command for the device from the mobile terminal, transmitting the received control command to the device so that the device may be controlled in accordance with the control command,
    wherein the method further comprises:
    if the device that is not stored in the application exists in the home network, transmitting a sub application that includes a user interface which displays status information of the device that is not stored in the application to the mobile terminal.

2. The method of claim 1, further comprising:
    updating the list depending on whether the at least one device is connected to the home network.

3. The method of claim 2, wherein updating the list comprises:
    allocating an address upon discovery of the at least one device; and
    identifying a description of the discovered at least one device.

4. The method of claim 2, wherein the list is automatically added or deleted upon connection of the at least one device.

5. The method of claim 3, wherein the at least one device is discovered using a Simple Service Discovery Protocol (SSDP).

6. The method of claim 1, further comprising:
    configuring the user interface including at least one of status information of the at least one device, and a kind and a type of the control button, and transmitting the user interface to the mobile terminal.

7. The method of claim 1, wherein the status information includes at least one of a power status of the corresponding device, a current operation status, a component status and a material status.

8. A gateway for controlling a home network, the gateway comprising:
transceiver; and
a controller for controlling the transceiver to,
receive a connection request including user authentication information from a mobile terminal in the home network, wherein the connection request is transmitted based on an application installed in the mobile terminal;
performing an authentication procedure of the mobile terminal based on the user authentication information of the mobile terminal;
upon connecting with the mobile terminal, transmit a list of at least one device connected to the home network so that the mobile terminal is capable of displaying status information and a user interface including at least one control button for performing a different control operation according to a type of the at least one device selected by the user below the status information, to the mobile terminal;
receive a request for a current status information of a device selected by the user among the transmitted list and transmit the received request to the selected device;
receive a response of the current status information from the selected device in response to the request, and transmit the received response to the mobile terminal; and
upon receiving, a control command for the device from the mobile terminal, transmit the received control command to the device so that the device may be controlled in accordance with the control command,
wherein the controller is further configured to:
if the device that is not stored in the application exists in the home network, transmitting a sub application that includes a user interface which displays status information of the device that is not stored in the application to the mobile terminal.

9. The gateway of claim 8, wherein the controller updates the list depending on whether the at least one device is connected to the home network.

10. The gateway of claim 9, wherein the controller allocates an address upon discovery of the at least one device, and identifies a description of the discovered at least one device.

11. The gateway of claim 8, wherein the controller configures the user interface including at least one of status information of the at least one device, and a kind and a type of the control button, and transmits the user interface to the mobile terminal.

12. The gateway of claim 8, wherein the status information includes at least one of a power status of the corresponding device, a current operation status, a component status and a material status.

* * * * *